Figure 1:
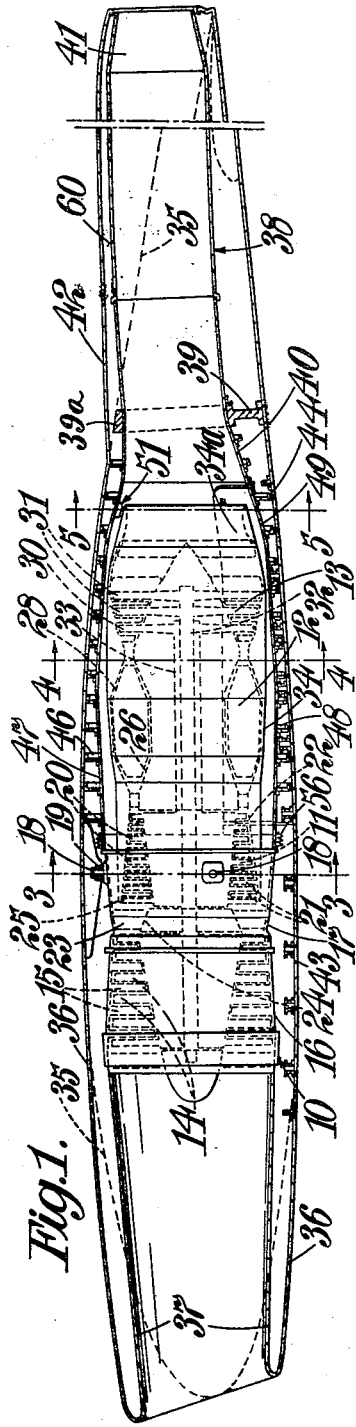

June 14, 1960   T. H. KERRY ET AL   2,940,692
AIRCRAFT STRUCTURES WITH POWER PLANTS
Filed Jan. 5, 1954   5 Sheets-Sheet 1

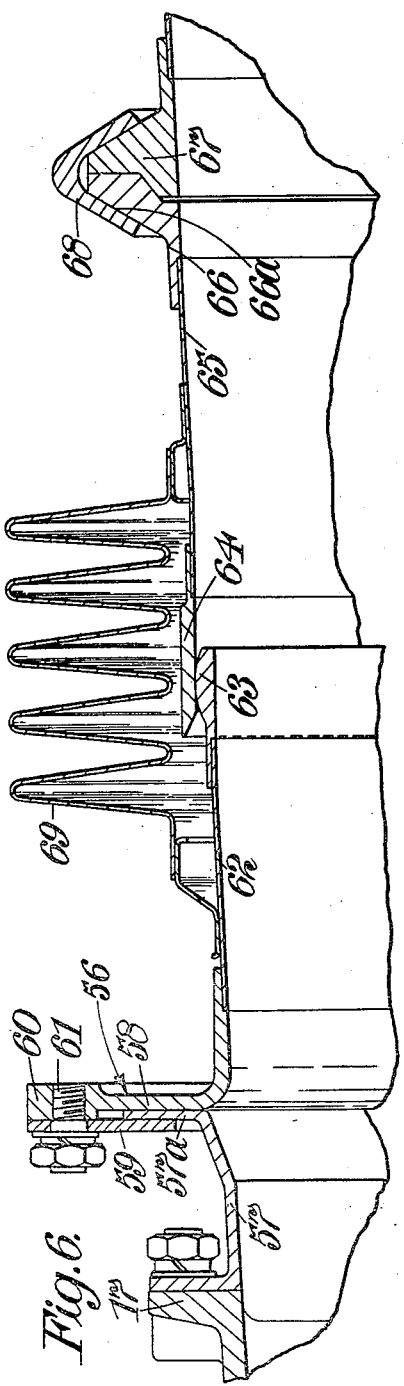
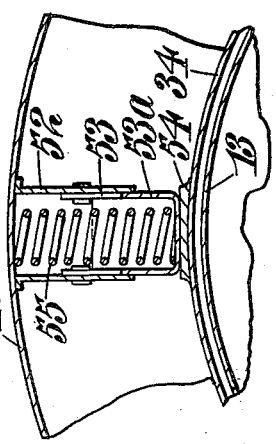
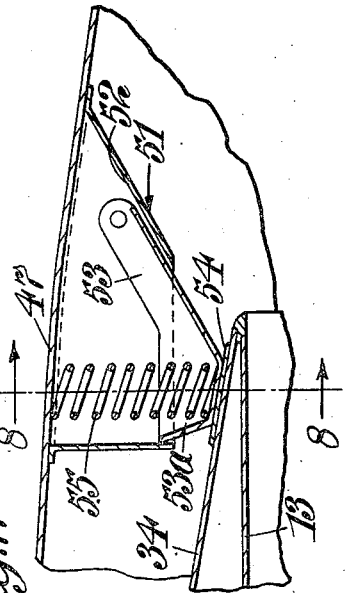

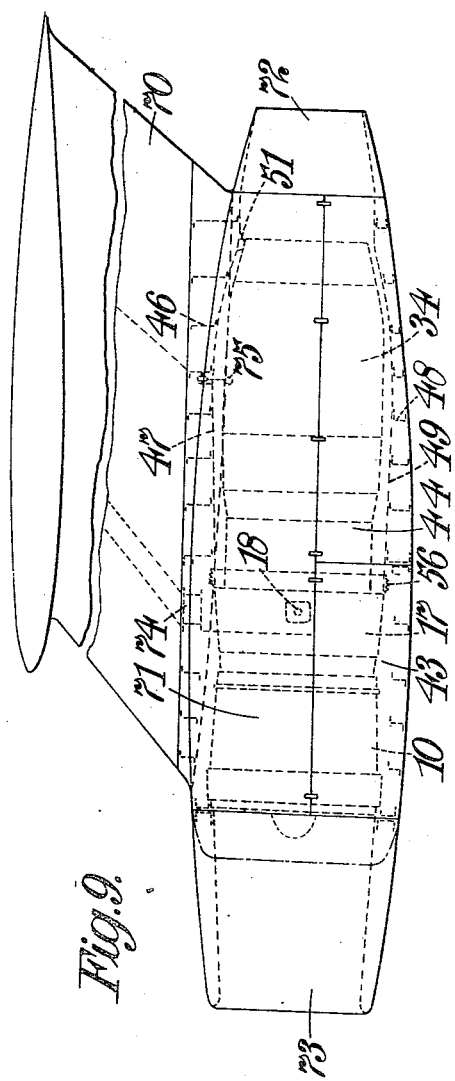

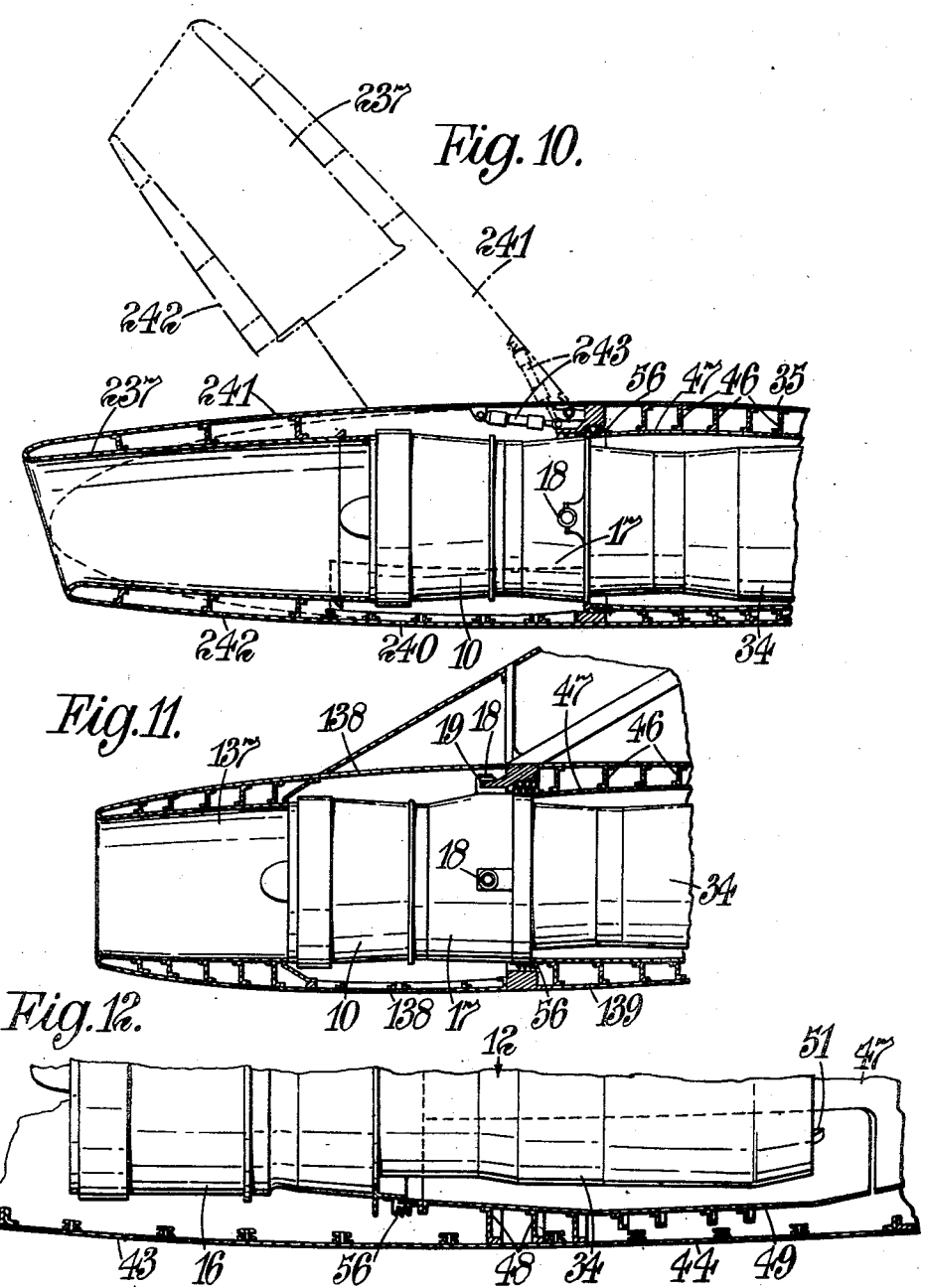

United States Patent Office  2,940,692
Patented June 14, 1960

2,940,692

AIRCRAFT STRUCTURES WITH POWER PLANTS

Thomas Henry Kerry, Derby, and Peter Arthur Ward, Littleover, England, assignors to Rolls-Royce Limited, Derby, England, a British company Filed Jan. 5, 1954, Ser. No. 402,352

Claims priority, application Great Britain Jan. 13, 1953

11 Claims. (Cl. 244—15)

This invention relates to aircraft and aircraft powerplant arrangements and is concerned with aircraft powered by by-pass gas-turbine engines.

A by-pass gas-turbine engine comprises a low-pressure compressor section arranged so that part of the compressed air therefrom flows into a high-pressure compressor section and then through combustion equipment and a turbine section to a jet-pipe with an outlet afforded by a propelling nozzle, and so that another part of the air therefrom flows into a by-pass duct extending from the low-pressure compressor to downstream of the combustion equipment and turbine section either to enter the exhaust duct and mix with the hot exhaust gases from the turbine section or to flow to atmosphere through a separate nozzle, which may encircle the propelling nozzle of the jet-pipe.

This invention has for an object to provide an improved by-pass gas-turbine engine installation in an aircraft structure.

According to this invention, in a by-pass gas-turbine engine installation in an aircraft structure, the aircraft structure provides part at least of the outer wall of the by-pass duct of the engine, whereof the compressor sections, the combustion equipment and turbine section are removable as a unit from said aircraft structure without removal of said outer wall part.

According to a feature of the invention, said part of the outer wall forms an integral load-bearing part of the aircraft structure.

According to another feature of this invention, the outer wall part which forms an integral load-bearing part of the structure may be a part-annular portion of the outer wall of the by-pass duct and there may be provided a further part-annular portion formed as a removable panel for giving access to the engine, say through the underside of a fuselage or wing structure.

According to another feature of the invention, the removable engine unit may be inserted into and removed from the bay through the underside of the fuselage or wing structure.

According to yet another feature of the invention, the removable engine unit may be inserted into and removed from the bay through a forwardly-facing entry to the bay.

According to a further feature of this invention, there is also provided a transition structure affording a passage whereof the wall is a smooth continuation of the downstream end of said outer wall part, and the passage receives both the by-passed air from the by-pass duct and the exhaust gases from the turbine section, which has an outlet duct part supported in spaced relation to the outer wall part or its continuation and slidingly disengageable from the wall or walls. The transition structure conveys the exhaust gases and by-pass air to the jet-pipe.

Figure 2:
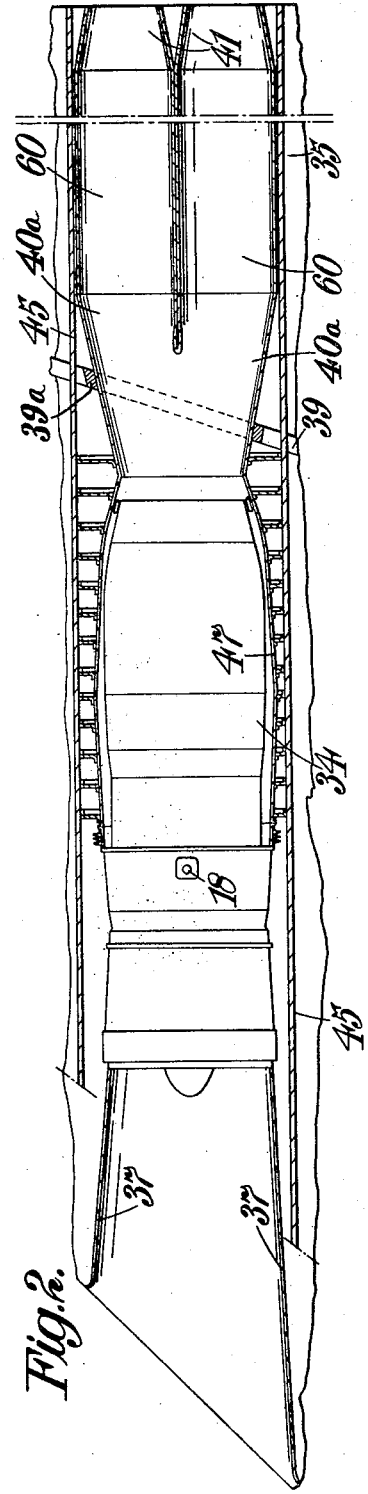
Figure 3:
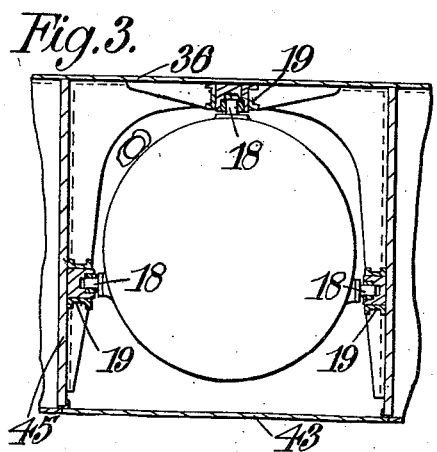
Figure 4:
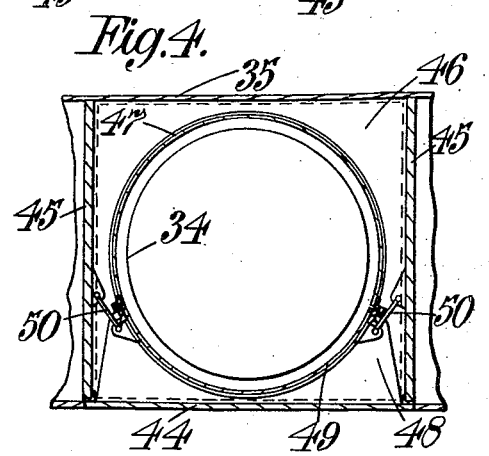
Figure 5:
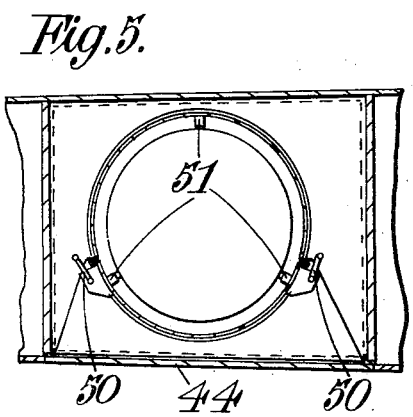

Some constructions of aircraft structure having a by-pass gas-turbine engine mounted therein will now be described with reference to the accompanying drawings, in which:

Figure 1 is a chordwise section through an aircraft wing showing an engine installation, with parts cut away, Figure 2 is a plan view of Figure 1, with parts cut away, Figures 3, 4 and 5 are sections on the lines 3—3, 4—4, and 5—5, respectively of Figure 1, Figure 6 shows an optional detail of construction, Figure 7 shows a further optional detail of construction, Figure 8 is a section on the line 8—8 of Figure 7, Figure 9 is an axial sectional view of an engine in a pod mounting, Figure 10 is a view corresponding to Figure 1 showing an alternative arrangement, Figure 11 is a view corresponding to Figure 10 showing yet another alternative arrangement, and Figure 12 is a fragmentary side elevational view with parts in section illustrating more clearly the removable characteristics of the panels 43, 44 and 49.

Referring to the drawings, the by-pass engine comprises a low-pressure compressor section 10, a high-pressure compressor section 11, combustion equipment 12, and a multi-stage turbine section 13 all connected together as a unit. The low-pressure compressor section is of the axial-flow kind and comprises a number of stages of rotor blading 14 and stator blading 15. Secured to the downstream end of the stator casing 16 of the low-pressure compressor 10 is a delivery duct structure comprising a slightly divergent casing section 17 which has at points spaced around it a number of mounting members in the form of radially-projecting stubshafts 18. The stubshafts 18 engage in trunnnion bearing structures 19 secured to the aircraft wing structure.

The high-pressure compressor section is also of the axial-flow type comprising a plurality of stages of rotor blades 20 and stages of stator blading 21, the latter being mounted in a casing 22, and the inlet end of the high-pressure compressor section is open to the space within the divergent casing 17 which forms a delivery duct for the low-pressure compressor 10. The casing 17 supports through struts 23 an inner wall 24 which defines the inner boundary of the air flow annulus and also affords a bearing housing. The casing 22 of the high-pressure compressor section 11 is however radially spaced inwards from the divergent casing 17 so that an annular outlet 25 is left from the divergent casing 17 around the outside of the high-pressure compressor section 11.

The high-pressure compressor section 11 delivers compressed air into the combustion equipment 12 of the engine and the combustion equipment may be of any convenient kind and may have, for example, as shown, an annular air casing formed by coaxial annular walls 26, 27 with a plurality of individual flame tubes 28 disposed in the space between the annular flame tube walls 26, 27 or with an annular flame tube coaxial with the air casing walls. Fuel is delivered into the flame tubes through fuel injectors (not shown) to be burnt with the air entering from the high-pressure compressor section 11.

The turbine section 13 is connected to receive the combustion products from the combustion equipment and comprises conveniently a multi-stage axial-flow turbine comprising, for instance, a high-pressure turbine 30 connected to drive the rotor blading 20 of the high-pressure compressor section 11 and an independently-rotating low-pressure turbine 31 to drive the rotor blading 14 of the low-pressure compressor section 10, there being shafts 32, 33 interconnecting the turbine and compressor rotors, the one shaft 32 being nested one within the other shaft 33.

Referring now to Figures 1 to 5, the high-pressure compressor section 11, the combustion equipment 12 and the turbine section 13 are all enclosed in a continuous fairing 34 which extends from the inlet end of the casing 21 of the high-pressure compressor section 11, where it is spaced radially inwardly from the divergent casing 17, to adjacent the outlet end of the turbine section 13 where the fairing is made convergent.

The by-pass engine unit as just described is housed in the wing structure of the aircraft and the installation comprises an air intake duct section formed by bulges 36 in the outer skin 35 of the aircraft wing and an inner skin 37 which extends from an entry to the duct adjacent the leading edge of the wing rearwardly to adjacent the location of the inlet to the low-pressure compressor section 10 of the engine when the latter is housed within the wing. It is conveniently arranged that the trailing edge of the inner skin 37 provides a smooth continuation of the outer wall of the annular air flow passage through the low-pressure compressor section 11 of the engine as afforded by its casing 16.

The bulges 36 in the outer skin of the wing merge smoothly into the surface 35 of the wing and at its rear end the wing accommodates in further bulges 42 an exhaust duct section 38 associated with the engine which extends from adjacent a main spar of the wing, say, the rear spar 39 of the wing where the duct passes through the spar to adjacent the trailing edge of the wing. The spar 39 is conveniently banjo-shaped to permit the passage therethrough of a transition section 40 of the exhaust duct, which may be built into the rear spar to obtain maximum area, and which at its upstream end receives exhaust gases from the turbine section 13 of the engine and at its downstream end feeds one or more jet-pipes 60 (two jet-pipes are shown), which extend rearwardly therefrom to outlet nozzles 41 at the trailing edge of the wing. Thus the spar 39 may as shown have a looped portion 39a (Figure 1) in line between the engine and the jet pipes 60 and the transition section 40 may extend through the looped portion 39a and be carried by it so that it remains in place when the engine unit and jet pipes are removed from the aircraft structure.

Between the bulges 36 of the air intake duct section and the bulges 42 of the exhaust duct section, the wing provides an engine bay to house the engine, and the underpart of the wing at this location is formed by removable panels 43, 44 to give access to the engine bay.

The engine bay is bounded at its sides by a pair of chordwise-extending ribs 45 and these ribs 45 are interconnected by a plurality of inverted U-shaped bulkheads 46 which are spaced apart chordwise of the wing and also interconnect the outer skin 35 of the wing with a part-annular wall member 47 which extends forwardly from the transition section 40 of the exhaust pipe to adjacent the location of the downstream edge of the divergent casing section 17 of the by-pass engine unit. The wall member 47 is approximately of the form of part of the surface of a cylinder and its cross-section is a segment slightly greater than a semi-circle. The opening in the circular cross-section of the wall member is directed downwards.

Conveniently the two removable panels 43, 44 (shown more clearly in Figure 12) forming the lower surface of the wing when removed provide access to the engine bay, and these panels abut adjacent the rear edge of the divergent casing section 17 of the by-pass engine. The panel 43 extends forwardly from this point to just forward of the inlet to the low-pressure compressor section 10 of the engine and the panel 44 extends rearwards to adjacent the transition section 40 of the exhaust duct, and just aft of the downstream end of fairing 34. The panels will be held in place by any known or convenient form of fastening, and may, when in position, form part of the stress-carrying structure of the wing.

When the panel 44 is removed from the wing 35, a series of chordwise-spaced bulkheads 48 are exposed which correspond in location to the location of the inverted U-section bulkheads 46 and act as stiffeners for a part-annular wall part 49 (shown more clearly in Figure 12) which forms together with the substantially part-cylindrical wall member 47 a complete circular annular wall spaced from the fairing 34 from adjacent the outlet end of the divergent casing section 17 to adjacent the convergent end of the fairing 34. The part-annular wall parts 47, 49 thus provide the outer wall of the by-pass duct of the engine which communicates with the outlet of the low-pressure compressor 10 through the delivery duct formed within the casing section 17, and are positioned so as to provide the desired cross-section of the duct. The wall part 49 which is exposed by removal of this second panel 44 is carried from the inverted U-shaped bulkheads 46 and the ribs 45 by suitable toggle fasteners 50. The toggle fasteners 50 may be of any known or convenient form. In an alternative arrangement the bulkheads 48 are secured to the panel 44 and abut the wall 49 when the panel 44 is fastened in position.

Removal of the first panel 43 exposes the three trunnion mountings 19 for engagement by the stubshafts 18 projecting from the divergent casing section 17 of the engine. The means 18, 19 form the load-supporting mounting means for the engine in the wing structure.

The part-annular walls 47, 49 which encircle the engine have adjacent the location of the convergent outlet end 34a of the fairing 34 a number of radially-inwardly-projecting spacer elements 51 which serve to locate the convergent outlet end of the engine unit to be coaxial with the transition section 40 of the exhaust duct. The outlet end 34a of fairing 34 is so mounted as to correct any misalignment between the engine and the wing structure and to allow for structural deflections in flight. The transition section 40 at its upstream end is circular and mates with the downstream end of the outer wall 47, 49 of the by-pass duct and changes gradually in cross sectional shape in the downstream direction to a form, aft of the spar 39, having two short circular stub pipes 40a mating with the upstream ends of the jet-pipes 60. (Figures 1 and 2.)

In one arrangement (Figures 7 and 8) the outlet end 34a is rigid with fairing 34 and each spacer element 51 comprises a sheet-metal housing 52 secured to the respective wall part 47 or 49 and a pivoted member 53 accommodated in the housing 52 with a foot portion 53a projecting from the housing to have contact with a rubbing pad 54 secured as by welding on the fairing 34. A spring 55 loads the foot portion 53a into contact with the pad 54.

In another arrangement the outlet end 34a is mounted on the fairing 34 by means of a joint providing for slight misalignment, for example as described in the specification of U.S. Patent No. 2,466,602, and the spacer elements 51 are rigid blister-shaped sheet-metal housings.

There is also provided sealing means 56 which is operative between the outlet edge of the divergent casing section 17 and the upstream edges of the by-pass duct wall parts 47, 49, to prevent leakage of pressure air from the working fluid annulus of the engine in operation.

One form for the sealing means 56 is illustrated in Figure 6. The casing section 17 has secured to its outlet edge a channel-section ring 57, one flange 57a of which is held axially between an angle-section ring 58 and a keeper ring 59 bolted to the ring 58, but is permitted to slide radially. There is a radial clearance between the outer edge of the flange 57a and a thickened ring 60 on the outer edge of the ring 58, and the ring 60 is threaded to receive studs 61 by which the keeper ring 59 is retained; this arrangement of radial sliding joint accommodates any parallel misalignment between the parts.

The angle-section ring 58 has secured to its axial flange an axially-extending sleeve 62 carrying at its end one element 63 of a sliding joint, the element having a part-spherical outer surface. The other element 64 of the sliding joint has a cylindrical inner surface and is carried on a sleeve 65 which has secured to its opposite end a ring 66 having a chamfered outward flange 66a. This ring 66 co-operates with chamfered part rings 67 on the upstream edges of wall parts 47, 49 and a clamping ring 68 co-acts with the rings 66, 67 to hold them in axial abutment. The clamping ring 68 is split at one point round its circumference and is tightened by means drawing the free ends together.

A bellows member 69 encircles the sliding joint 63, 64 and the ends of the bellows member 69 are secured in a gas-tight manner to the sleeve 62 and sleeve 65. This joint accommodates relative axial displacement and angular misalignment of the engine unit and the aircraft structure whilst preventing loss of pressure air.

In mounting the engine in the nacelle, the two panels 43, 44 are removed together with bulkheads 48, and the toggle fastenings 50 holding the removable wall part 49 are freed so that the wall part 49 can be removed from the wing. The engine unit above described is next inserted into the engine bay, and the convergent outlet portion 34a of the fairing 34 which encloses the high-pressure compressor section, the combustion equipment and the turbine section is engaged with the spacer elements 51 thereby to locate the turbine end of the unit, and the stubshafts 18 on the divergent casing section 17 are engaged with their respective bearing mountings 19. The second wall part 49 is now fitted in position and secured by means of the toggle fasteners 50. With the engine in this position the upstream edges of the part-cylindrical wall members 47, 49 are close to and aligned with the downstream edge of the divergent casing section 17 of the engine unit and these wall parts are interconnected with the section 17 by the flexible gas-sealing joint 56. Thus, the part-cylindrical wall member 47 and the wall part 49 associated with it form a continuation of the divergent casing section 17 of the engine unit and, in operation of the engine, part of the air delivered by the low-pressure compressor section 10 flows through the annular outlet 25 into the space between the completely annular wall, as formed by the substantially part-cylindrical wall member 47 and the associated wall part 49, and the fairing 34 which encloses the high-pressure compressor section 11, the combustion equipment 12 and the turbine section 13, thereby to by-pass these parts of the engine unit and to flow directly into the transition section 40 leading to the jet pipes 60.

With this construction according to this invention, it will be seen that the wing structure or enclosing nacelle for the by-pass engine is arranged to form part of the engine so that thereby the space occupied by a given size of such engine is reduced or alternatively the size of by-pass engine which may be accommodated within a given space can be increased.

The wall members 47, 49 forming both part of the wing structure and the wall of the by-pass duct of the engine will usually together be of circular annular form, but in a second arrangement in which a pair of by-pass engines are arranged in the wing side by side, the wall parts will together be of hour-glass section, being separately of rounded W-section.

Referring now to Figure 9, there is illustrated a similar installation wherein the by-pass engine is accommodated in a pod nacelle. The nacelle is at the end of a strut structure 70 which projects from the underside of a wing, and comprises a fixed nacelle skin section 71 secured on the bulkheads 46 carrying the engine bay wall part 47, a pair of detachable panels 43, 44, a detachable final nozzle section 72 which is mounted on the after end of the pod nacelle, and a detachable air intake section 73 the after edge of which is substantially in the plane of the inlet to the engine low-pressure compressor section 10.

In this construction, the removable wall part 49 of the by-pass duct, the bulkheads 48 and the panel 44 are made in one so that when the panel 44 is removed, the wall part 49 is detached also.

The engine is supported in the nacelle by stubshafts 18 at each side engaging in bearing mountings carried at the ends of a U-shaped box girder 74, and by means of a swinging link 75 pivoted at one end to one of the bulkheads 46 and at its opposite end to a point on the engine unit.

In some arrangements the removable panels 43, 44 provided to give access to the engine may be omitted and the engine fitted into the bay through the forward end thereof.

For example as shown in Figure 11, the air intake duct 137 and the forward section 138 of the nacelle or wing is made detachable from the remainder 139 of the nacelle or wing adjacent the stub shafts 18 of the load-bearing structures, which shafts 18 as in Figures 1 to 3 and 9 are on the low-pressure compressor 17 of the engine the duct 137 and the nacelle section 138 will be removed bodily, so enabling the engine to be installed in or removed from the engine bay through the forward end of the main part 139 of the nacelle or wing.

Alternatively, as shown in Figure 10, after removal of a panel 240, the air intake duct 237 and the upper and lower surfaces 241, 242 of the nacelle or wing forward of the engine may be caused to hinge by built-in jacks 243 to permit axial insertion or removal of the engine, thus obviating the need for ground equipment to receive the intake duct section.

We claim:

1. An aircraft including aircraft structure and power plant means mounted in the aircraft structure; said power plant means comprising an air intake structure, a low-pressure compressor connected to said air intake structure to take in air therefrom, a high-pressure compressor connected to said low-pressure compressor to receive part of the air compressed thereby, combustion equipment connected to said high-pressure compressor to receive air compressed therein for combustion with fuel in the combustion equipment, and a turbine section connected to receive the products of combustion from said combustion equipment and connected to the low-pressure compressor and the high-pressure compressor to drive them, said compressors, combustion equipment and turbine section being rigidly connected together to form a structural unit for removal and installation purposes, said low-pressure compressor having a delivery duct structure whereof the delivery duct communicates with the entry of the high-pressure compressor and with an annularly-extending outlet; and said aircraft structure including a structural element comprising a wall extending around part at least of the periphery of said structural unit and being spaced therefrom to provide a by-pass duct between the structural unit and the wall, and connecting means between said wall and said delivery duct structure to place said by-pass duct at its inlet end in communication with said annularly-extending outlet whereby said by-pass duct is fed with air compressed in the low-pressure compressor which thus by-passes the high-pressure compressor, combustion equipment and turbine section, and exhaust duct means connecting the outlet of said turbine section and the outlet of said by-pass duct to atmosphere.

2. An aircraft as claimed in claim 1 wherein said wall provides a part-annular portion of the outer wall of the by-pass duct, and there is provided a part-annular removable panel for giving access to the said structural unit including the power plant means and affording a further part-annular portion of the outer wall of the by-pass duct.

3. An aircraft as claimed in claim 2 comprising also removable panel means which includes a portion of the outer skin of the aircraft and covers part of said structural unit and said part-annular removable panel, whereby on detachment of said removable panel means the structural unit and said part-annular removal panel are exposed.

4. An aircraft as claimed in claim 2 wherein the aircraft structure comprises a detachable outer skin portion covering the removable panel and wherein said portion of the aircraft outer skin and said removable panel are secured together for simultaneous detachment.

5. An aircraft as claimed in claim 1 comprising also a transition structure having a passage-defining wall defining a passage receiving both the by-passed air from the by-pass duct and the exhaust gases from the turbine section, which passage-defining wall is a smooth continuation of the downstream end of the wall of the structural element, and the turbine section having an outlet duct part supported in spaced relation to and being slidingly engaged in said wall of the aircraft structure.

6. An aircraft as claimed in claim 5 comprising a wing including a main spar, and having the structural unit including the power plant means accommodated in the wing and the transition section built in to the main spar.

7. An aircraft as claimed in claim 1 wherein the delivery duct structure comprises a casing section which is formed with said annularly-extending outlet and which affords an upstream continuation of said wall of the by-pass duct, and there is provided a readily-disconnectible, gas-sealing joint connecting the downstream end of said casing section and the upstream end of said wall.

8. An aircraft as claimed in claim 7, wherein said readily-disconnectible, gas-sealing joint also comprises means adapted to accommodate relative displacement of the structural unit and said wall of the structural element.

9. An aircraft as claimed in claim 1, wherein the wall of said structural element is of substantially U-section, the gap between the edges of the wall being greater than the diameter of the engine unit at that station, whereby on removal of said removable panel the engine unit may be removed through the gap.

10. An aircraft as claimed in claim 1, wherein the structural unit aft of any point on the wall of said structural element is of smaller diameter than the diameter of the wall at that point, whereby the engine unit may be inserted into and removed from the engine bay through a forwardly-facing entry to the bay.

11. An aircraft as claimed in claim 10, wherein said wall is fully annular.

References Cited in the file of this patent

UNITED STATES PATENTS

| | | |
|---|---|---|
| 2,437,385 | Halford | Mar. 9, 1948 |
| 2,458,600 | Imbert et al. | Jan. 11, 1949 |
| 2,493,641 | Putz | Jan. 3, 1950 |
| 2,516,671 | Bowers et al. | July 25, 1950 |
| 2,529,955 | Morley | Nov. 14, 1950 |
| 2,564,042 | Walker | Aug. 14, 1951 |
| 2,588,532 | Johnson | Mar. 11, 1952 |
| 2,640,317 | Fentress | June 2, 1953 |
| 2,641,422 | Oulianoff et al. | June 9, 1953 |
| 2,663,517 | Price | Dec. 22, 1953 |
| 2,676,459 | Marchant | Apr. 27, 1954 |
| 2,680,346 | Michael | June 8, 1954 |

FOREIGN PATENTS

| | | |
|---|---|---|
| 55,382 | France | Jan. 9, 1952 |
| | (Addition to No. 971,992) | |